(12) United States Patent
Wang

(10) Patent No.: US 10,770,778 B2
(45) Date of Patent: Sep. 8, 2020

(54) SELF-LOCKING FIXING DEVICE AND ANTENNA ASSEMBLY

(71) Applicant: Nokia Shanghai Bell Co., Ltd., Shanghai (CN)

(72) Inventor: Zhendong Wang, Shanghai (CN)

(73) Assignee: Nokia Shanghia Bell Co., Ltd., Shanghai (CN)

(*) Notice: Subject to any disclaimer, the term of this patent is extended or adjusted under 35 U.S.C. 154(b) by 0 days.

(21) Appl. No.: 15/569,956

(22) PCT Filed: Apr. 18, 2016

(86) PCT No.: PCT/CN2016/079547
§ 371 (c)(1),
(2) Date: Oct. 27, 2017

(87) PCT Pub. No.: WO2016/173419
PCT Pub. Date: Nov. 3, 2016

(65) Prior Publication Data
US 2018/0159200 A1     Jun. 7, 2018

(30) Foreign Application Priority Data

Apr. 27, 2015 (CN) .......................... 2015 1 0209353

(51) Int. Cl.
*H01Q 1/12* (2006.01)
*F16B 19/10* (2006.01)
*F16B 15/04* (2006.01)

(52) U.S. Cl.
CPC .......... *H01Q 1/1207* (2013.01); *F16B 15/04* (2013.01); *F16B 19/1081* (2013.01); *H01Q 1/12* (2013.01)

(58) Field of Classification Search
CPC ........ H01Q 1/1207; H01Q 1/12; F16B 15/04; F16B 19/1081

USPC ......................................................... 343/878
See application file for complete search history.

(56) References Cited

U.S. PATENT DOCUMENTS 4,921,382 A     5/1990 Fries et al.
6,079,920 A *   6/2000 Dispenza .............. F16B 37/061
                                                    411/107
(Continued)

FOREIGN PATENT DOCUMENTS

CN         2272616 Y      1/1998
CN       202678500 U      1/2013
(Continued)

OTHER PUBLICATIONS

English Bibliography of JP11141516A, Published on May 25, 1995, Printed from Derwent Innovation on Nov. 16, 2018, 3 pp.
(Continued)

*Primary Examiner* — Huedung X Mancuso
(74) *Attorney, Agent, or Firm* — Fay Sharpe LLP

(57) ABSTRACT

A self-locking fixing device and an antenna assembly are provided. The self-locking fixing device includes an inner mandrel arranged to include a nail head and a nail rod extending away from the nail head, and a bushing arranged to include a nail head bushing and a nail rod bushing extending away from the nail head bushing. A sidewall of the nail head bushing is provided with at least two elastic clamping units. If the inner mandrel is assembled with the bushing, the nail head is located in the nail head bushing, the nail rod is located in the nail rod bushing, and clamping portions of the elastic clamping units are engaged with an upper surface of the nail head to clamp the nail head in the nail head bushing.

17 Claims, 5 Drawing Sheets

(56) References Cited

U.S. PATENT DOCUMENTS

| | | | | |
|---|---|---|---|---|
| 6,239,737 | B1 * | 5/2001 | Black | G06K 19/041 |
| | | | | 342/44 |
| 8,256,171 | B2 * | 9/2012 | Yeremian | E06B 5/003 |
| | | | | 52/204.1 |
| 2003/0040753 | A1 * | 2/2003 | Daum | A61B 17/3403 |
| | | | | 606/96 |
| 2004/0081529 | A1 | 4/2004 | Stanton et al. | |
| 2007/0253794 | A1 | 11/2007 | Zhang et al. | |
| 2017/0025742 | A1 | 1/2017 | Zhou et al. | |

FOREIGN PATENT DOCUMENTS

| | | |
|---|---|---|
| CN | 103322003 A | 9/2013 |
| CN | 103633414 A | 3/2014 |
| CN | 204921597 U | 12/2015 |
| GB | 1301516 | 12/1972 |
| JP | 11141516 A | 5/1999 |

OTHER PUBLICATIONS

PCT Patent Application No. PCT/CN2016/079547, Written Opinion of the International Searching Authority, dated Jul. 1, 2016, 7 pages.

English Bibliography of Chinese Patent Application No. CN103633414A, published on Mar. 12, 2014, printed from Derwent Innovation on Jan. 18, 2019, 5 pages.

European Patent Application No. 16785850.5-1010 / 3291365 PCT/CN2016/079547, Extended European Search Report, dated Dec. 6, 2018, 7 pages.

International Search Report for PCT/CN2016/079547 dated Jul. 1, 2016.

* cited by examiner

SELF-LOCKING FIXING DEVICE AND ANTENNA ASSEMBLY

TECHNOLOGY

The present disclosure generally relates to the field of antenna manufacturing, and more specifically, to a self-locking fixing device for an antenna apparatus.

BACKGROUND

When an antenna is assembled, a particular apparatus is often needed for fixing. Nylon rivets are widely used as a fixing means in antenna manufacturing.

The commonly used rivets usually have negative effects on antennas. For example, they have at least the following problems:

For a standard nylon rivet, an end of its inner mandrel will be higher than the bushing after assembling. If the end of the inner mandrel is collided during producing or utilizing of an antenna, the fixed connection formed by the rivet will become loose.

In addition, after an antenna is assembled, rivets will naturally become loose as usage time increases, which would influence RF performance of the antenna.

Therefore, there is a need for a fixing device with good fixing performance.

SUMMARY

For the above problems, the present disclosure provides a fixing device with a self-locking function, which is not only easy to mount but also avoids becoming loose after a long time.

First of all, the present disclosure proposes a self-locking fixing device, which includes an inner mandrel arranged to include a nail head and a nail rod extending away from the nail head, and a bushing arranged to include a nail head bushing and a nail rod bushing extending away from the nail head bushing. A sidewall of the nail head bushing is provided with at least two elastic clamping units. If the inner mandrel is assembled with the bushing, the nail head is located in the nail head bushing, the nail rod is located in the nail rod bushing, and clamping portions of the elastic clamping units are engaged with an upper surface of the nail head to clamp the nail head in the nail head bushing.

Preferably, a bottom of the nail rod bushing is arranged to include at least two elastic segments formed through cutting. If the inner mandrel is assembled with the bushing, the bottom of the nail rod forces the at least two elastic segments to spread out, and a relative clamping distance is formed between the at least two spread-out elastic segments and the nail head bushing.

Preferably, outer surfaces of the at least two elastic segments are smooth outer convex curved surfaces.

Preferably, if the inner mandrel is assembled with the bushing, the bottom of the nail rod does not go beyond the at least two spread-out elastic segments in the direction extending from the nail rod to the nail head.

Preferably, the bottom of the nail rod is arranged as an outer convex curved surface.

Preferably, the nail head includes an upper surface, a lower surface opposite to the upper surface, at least one side surface arranged between the upper surface and the lower surface, and an area of the upper surface is larger than or equal to that of the lower surface.

Preferably, a first side surface, a second side surface and a third side surface are arranged between the upper surface and the lower surface, the first side surface adjoins the upper surface and forms a first chamfer angle, the second side surface adjoins the lower surface and forms a second chamfer angle, and the first chamfer angle is smaller than the second chamfer angle.

Preferably, a distance between lower ends of the clamping portions and a bottom of the nail head bushing differs from a thickness of the nail head by 0.1 mm to 0.2 mm.

Preferably, the sidewall of the nail head bushing is provided with three elastic clamping units.

The present disclosure further provides an antenna assembly, which includes an oscillator provided with at least one first fixing hole thereon and an insulating plate provided with a second fixing hole thereon corresponding to the fixing hole on the oscillator, wherein the oscillator and the insulating plate are fixedly coupled via the self-locking fixing device according to any of claims 1-9.

With the self-locking fixing device of the present disclosure, a sound fixing function can be achieved. When it is employed in an antenna, PIM and VSWR performance of the antenna can be enhanced, and the rework rate and manufacturing costs may be reduced.

BRIEF DESCRIPTION OF THE DRAWINGS

Through the following description of the detailed embodiments of the present disclosure with reference to the accompanying drawings, the present disclosure will become more comprehensible, and other purposes, specifics, features and advantages of the present invention will become more apparent. In the drawings.

DETAILED DESCRIPTION

Figure 1A:
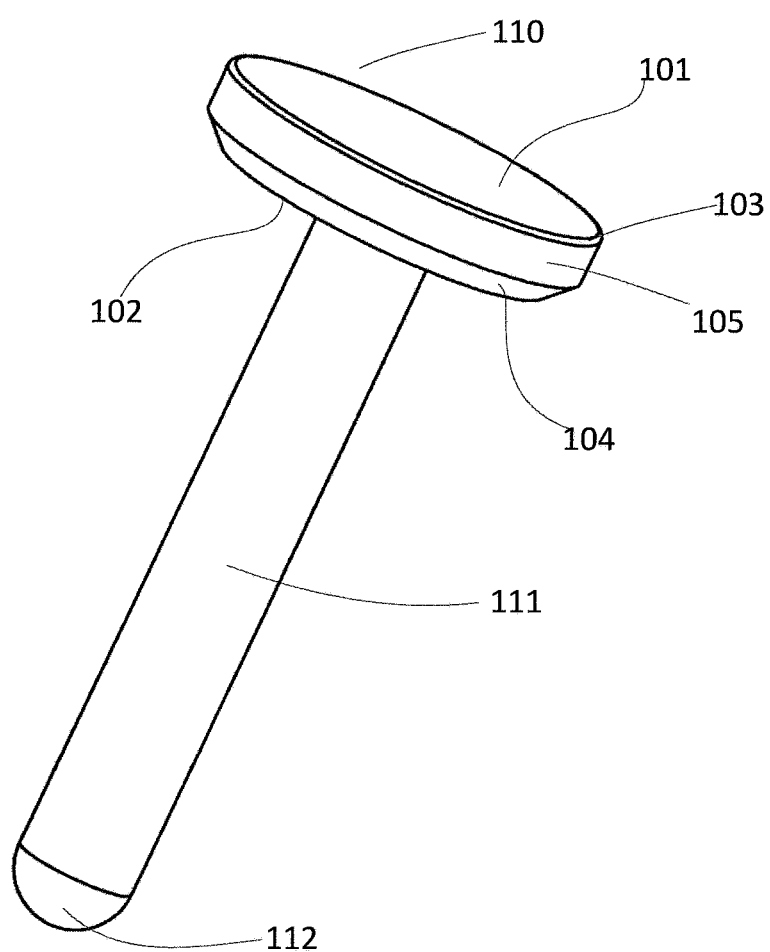
FIG. 1a is a schematic diagram of an inner mandrel of a self-locking fixing device according to the embodiments of the present disclosure.

Preferred embodiments of the present disclosure will be described in the following text in greater detail with reference to the drawings. Although preferred embodiments of the present disclosure are displayed in the drawings, it should be understood that the present disclosure can be implemented in various manners, not limited to the embodiments illustrated herein. On the contrary, these embodiments are provided to make the present disclosure more thorough and complete and convey the scope of the present disclosure completely to those skilled in the art.

FIG. 1a is a schematic diagram of an inner mandrel of a self-locking fixing device according to the embodiments of the present disclosure.

An inner mandrel 10 includes a nail head 110 and a nail rod 111 extending away from the nail head 110, where the nail head 110 includes an upper surface 101, a lower surface 102 arranged opposite to the upper surface 101, a first side surface 103, a second side surface 104 and a third side surface 105. The first side surface 103 adjoins the upper surface 101 and forms a first chamfer angle C1; and the second side surface 104 adjoins the lower surface 102 and forms a second chamfer angle C2.

A bottom 112 of the nail rod 111 (namely, the other end opposite to the nail head 110) is constructed as an outer convex curved surface, such as an oval or a semicircle.

Figure 1B:
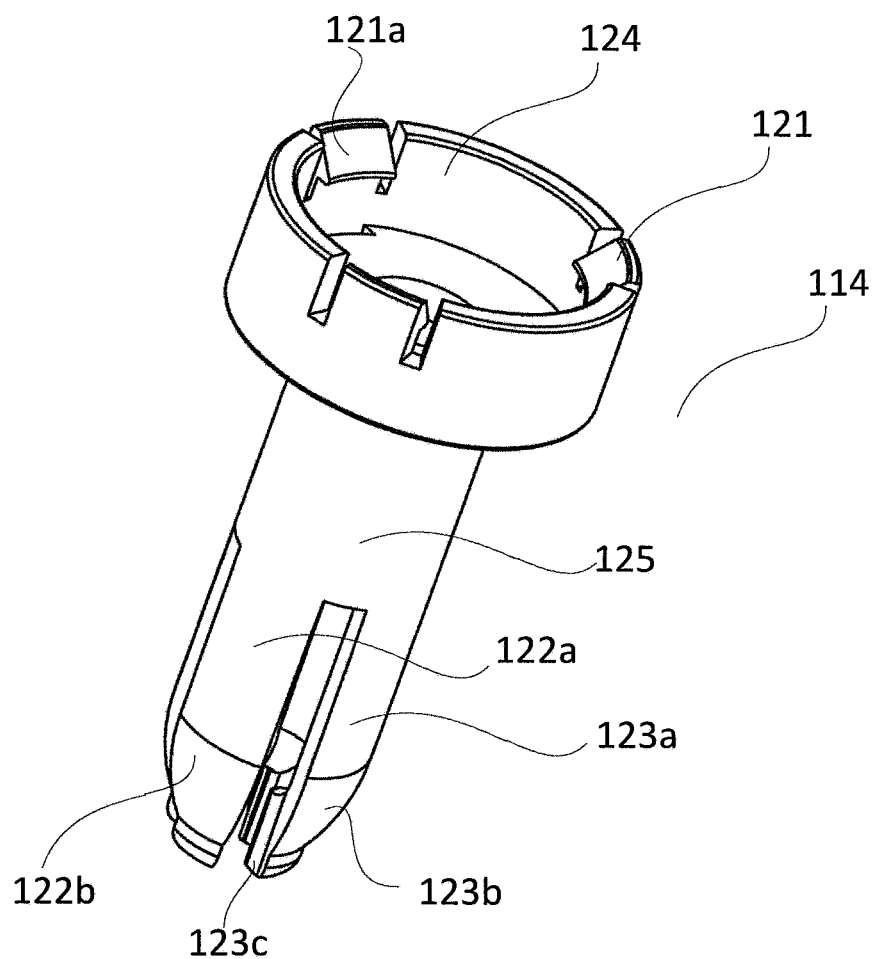
FIG. 1b is a schematic diagram of a bushing of the self-locking fixing device according to the embodiments of the present disclosure.

FIG. 1b is a schematic diagram of a bushing of the self-locking fixing device according to the embodiments of the present disclosure.

A bushing 114 includes a nail head bushing 124 and a nail rod bushing 125, where the nail rod bushing 125 extends away from the nail head bushing 124, and a sidewall of the nail head bushing 124 is provided with at least two elastic clamping units. In this embodiment, there are three elastic clamping units 121. An end of the elastic clamping unit 121 is provided with a stopper 121a.

The lower part of the nail rod bushing 125 (namely, the part opposite to the nail head bushing 124) is formed with four elastic segments through cutting. A first elastic segment in the figure includes a first segment 122a and a second outer convex segment 122b formed through cutting along the nail rod bushing 125. Other elastic segments have a same structure as that of the first elastic segment. For instance, a second elastic segment includes a first segment 123a and a second outer convex segment 123b formed through cutting along the nail rod bushing 125. It shall be appreciated that the lower part of the nail rod bushing 125 can meet the fixing requirement so long as it is formed with at least two elastic segments through cutting.

To enable the elastic segments to spread out fully when the inner mandrel 10 is assembled with the bushing 114, the inner surface of the second segment is further provided with an inner convex part 123c, so that the bottom 112 of the nail rod 111 can rest against the inner convex part 123c when the nail rod 111 enters the bushing 114, thereby the elastic segments can fully spread out. Since the bottom 112 of the nail rod 111 is an outer convex curved surface, the upper surface of the inner convex part 123c is preferably arranged to be adapted to the shape of the outer convex bottom 112 to facilitate the assembling of the inner mandrel 10 and the bushing 114.

Figure 2A:
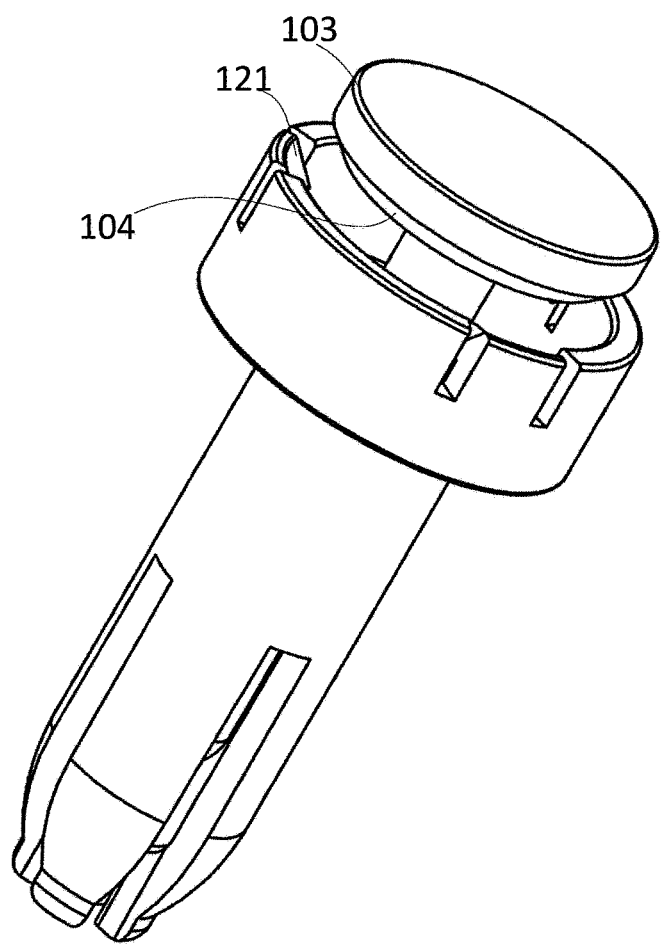
FIG. 2a is a schematic diagram of the self-locking fixing device when being assembled according to the embodiments of the present disclosure.
Figure 2B:
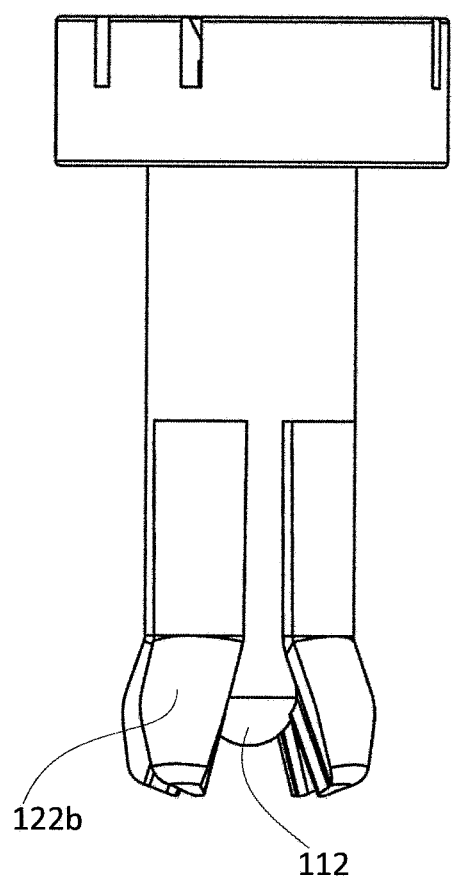
FIG. 2b is a schematic diagram of the self-locking fixing device after being assembled according to the embodiments of the present disclosure.

Reference is made to FIG. 2a and FIG. 2b simultaneously. FIG. 2a is a schematic diagram of the self-locking fixing device when being assembled according to the embodiments of the present disclosure, and FIG. 2b is a schematic diagram of the self-locking fixing device after being assembled according to the embodiments of the present disclosure.

During the assembling, due to the presence of the second chamfer angle C2, the second side surface 104 is adapted to a clamping portion 121a in shape so that the nail head 110 may be readily mounted into the nail head bushing 124. Then, the clamping portion 121a may be engaged with the upper surface 101 of the nail head 110, thus clamping the nail head 110. Preferably, the first chamfer angle C1 is smaller than the second chamfer angle C2, such that the clamping portion 121a may better clamp the nail head 110 and mechanical or manual assembling are facilitated. It shall be appreciated that the number of side surfaces between the upper surface 101 and the lower surface 102 is at least one and the area of the upper surface 101 is larger than or equal to that of the lower surface 102, so as to ensure that the assembling is facilitated and a clamping function is achieved when the side surfaces are engaged with the clamping portion 121.

When the number of the side surfaces between the upper surface 101 and the lower surface 102 is one, the side surface does not form chamfer angles with the upper surface 101 and the lower surface 102. However, as the area of the upper surface 101 is larger than that of the lower surface 102, there is a slope between the two surfaces for facilitating engagement with the clamping portion 121a. When the assembling is completed, the upper surface 101 will be clamped by the lower end of the clamping portion 121a.

When the assembling is completed (namely, the inner mandrel 10 is totally inserted into the bushing 114), the inner convex portions 123c of the elastic segments will be spread out due to pressure from the bottom 112 of the nail rod 111. A relative clamping distance is formed between the spread-out elastic segments and the nail head bushing 124. Besides, when the bottom 112 of the nail rod 111 is applied by accident with an upward force (for example, a force caused by colliding of a machine or an operator during the assembling), the clamping portion 121a can prevent the nail rod 111 from moving upwards and becoming loose. To further prevent the self-locking device from becoming loose, the present disclosure also proposes arranging the length of the bushing longer than that of the nail rod 110. That is, when the elastic segments are spread out, the bottom 112 of the nail rod 111 is still surrounded by the elastic segments and the bottom 112 does not go beyond the spread-out elastic segments in the direction extending from the nail head 110 along the nail rod 111. This feature is shown clearly in FIG. 2b.

To enhance the performance of the self-locking fixing device of the present disclosure, improvement is made to the thickness of the nail head 110 and the distance between the lower end of the clamping portion 121a and the bottom of the nail head bushing 124 in the present disclosure. Preferably, the distance between the lower end of the clamping portion 121a and the bottom of the nail head bushing 124 differs from the thickness of the nail head 110 by 0.1 mm to 0.2 mm.

Figure 3:
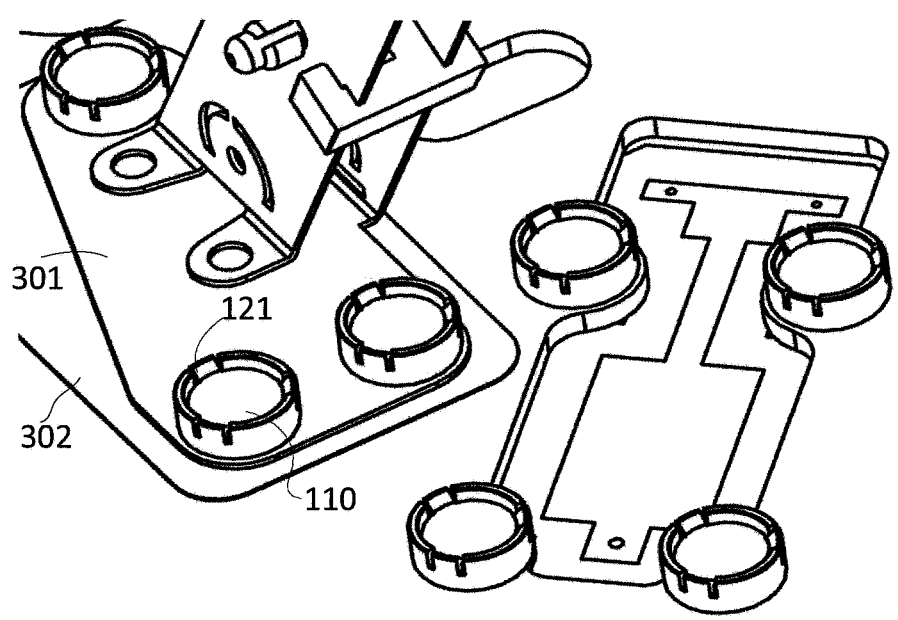
FIG. 3 is a schematic diagram of an antenna assembly with the self-locking fixing device according to the embodiments of the present disclosure.

FIG. 3 is a schematic diagram of an antenna assembly with the self-locking fixing device according to the embodiments of the present disclosure.

An antenna assembly 30 includes an oscillator 301 and an insulating plate 302, where both are provided with at least one fixing hole, for instance, they are provided with a first fixing hole and a second fixing hole, respectively. When the oscillator 301 and the insulating plate 302 need to be fixed, the self-locking fixing device may be inserted through these two fixing holes and then the inner mandrel 10 and the bushing 114 may be assembled. Besides, as the bottom of the bushing 114 is designed as an outer convex curved surface, it is very easy for the bushing 114 to insert through the fixing holes. It can be understood that the total thickness of the oscillator 301 and the insulating plate 302 is smaller than or equal to the relative clamping distance formed between the spread-out elastic segments and the nail head bushing 124.

Furthermore, as can be seen from FIG. 3, since both ends of the inner mandrel 10 are located inside the bushing 114, even if a force is applied to any end of the self-locking fixing device, the inner mandrel 10 and the bushing 114 would not move relative to each other and thus become loose.

With the self-locking fixing device of the present disclosure, a good fixing function can be achieved. When it is applied to an antenna, PIM and VSWR performance of the antenna can be enhanced, and the rework rate and manufacturing costs may be reduced.

Therefore, the self-locking fixing device can be widely used to couple modules, PCB, LB oscillator and other important components, thereby improving the reliability of the antenna.

Those skilled in the art shall appreciate that the above state is only an example, rather than to limit the application scope of the present disclosure. Those skilled in the art can implement the described function with other alternatives for each specific application. However, this policy of implementation shall not be construed as departing from the scope of protection of the present disclosure.

I claim:

1. A self-locking fixing device, comprising:
   an inner mandrel arranged to include a nail head and a nail rod extending away from the nail head; and
   a bushing arranged to include a nail head bushing and a nail rod bushing extending away from the nail head bushing, a sidewall of the nail head bushing being provided with at least two elastic clamping units, each elastic clamping unit is provided with a clamping portion on an inner surface of the corresponding elastic clamping unit, the clamping portions of the at least two elastic clamping units extending inwardly from the sidewall of the nail head bushing;
   wherein, if the inner mandrel is assembled with the bushing, the nail head is located in the nail head bushing, the nail rod is located in the nail rod bushing, and the clamping portions of the at least two elastic clamping units are engaged with an upper surface of the nail head to clamp the nail head in the nail head bushing.

2. The self-locking fixing device of claim 1, wherein a bottom of the nail rod bushing is arranged to include at least two elastic segments formed through cutting, and wherein if the inner mandrel is assembled with the bushing, the bottom of the nail rod forces the at least two elastic segments to spread out, and a relative clamping distance is formed between the at least two elastic segments which are spread out and the nail head bushing.

3. The self-locking fixing device of claim 2, wherein outer surfaces of the at least two elastic segments are smooth outer convex curved surfaces.

4. The self-locking fixing device of claim 2, wherein if the inner mandrel is assembled with the bushing, in a direction extending from the nail head along the nail rod, the bottom of the nail rod does not go beyond the at least two elastic segments which are spread out.

5. The self-locking fixing device of claim 1, wherein a bottom of the nail rod is arranged as an outer convex curved surface.

6. The self-locking fixing device of claim 1, wherein the nail head includes:
   an upper surface;
   a lower surface opposite to the upper surface; and
   at least one side surface arranged between the upper surface and the lower surface,
   wherein an area of the upper surface is larger than or equal to that of the lower surface.

7. The self-locking fixing device of claim 6, wherein a first side surface, a second side surface and a third side surface are arranged between the upper surface and the lower surface, the first side surface adjoins the upper surface and forms a first chamfer angle, the second side surface adjoins the lower surface and forms a second chamfer angle, and the first chamfer angle is smaller than the second chamfer angle.

8. The self-locking fixing device of claim 1, wherein a distance between lower ends of the clamping portions of the at least two elastic clamping units and a bottom of the nail head bushing differs from a thickness of the nail head by 0.1 mm to 0.2 mm.

9. The self-locking fixing device of claim 1, wherein the sidewall of the nail head bushing is provided with three elastic clamping units.

10. The self-locking fixing device of claim 1, wherein the clamping portions of the at least two elastic clamping units are disposed at an upper end of the corresponding elastic clamping unit.

11. The self-locking fixing device of claim 1, wherein at least one side surface of the nail head and inner surfaces of the clamping portions of the at least two elastic clamping units are shaped to facilitate assembling the inner mandrel with the bushing.

12. The self-locking fixing device of claim 1, wherein, when the clamping portions of the at least two elastic clamping units are engaged with the upper surface of the nail head, lower ends of the clamping portions engage the upper surface of the nail head and clamp the nail head into the nail head bushing.

13. An antenna assembly, comprising:
   an oscillator provided with a first fixing hole thereon; and
   an insulating plate provided with a second fixing hole thereon corresponding to the first fixing hole on the oscillator,
   wherein the oscillator and the insulating plate are fixedly coupled by a self-locking fixing device, comprising:
   an inner mandrel arranged to include a nail head and a nail rod extending away from the nail head; and
   a bushing arranged to include a nail head bushing and a nail rod bushing extending away from the nail head bushing, a sidewall of the nail head bushing being provided with at least two elastic clamping units, each elastic clamping unit is provided with a clamping portion on an inner surface of the corresponding elastic clamping unit, the clamping portions of the at least two elastic clamping units extending inwardly from the sidewall of the nail head bushing;
   wherein, if the inner mandrel is assembled with the bushing, the nail head is located in the nail head bushing, the nail rod is located in the nail rod bushing, and the clamping portions of the at least two elastic clamping units are engaged with an upper surface of the nail head to clamp the nail head in the nail head bushing.

14. The antenna assembly of claim 13, wherein a distance between lower ends of the clamping portions of the at least two elastic clamping units and a bottom of the nail head bushing differs from a thickness of the nail head by 0.1 mm to 0.2 mm.

15. The antenna assembly of claim 13, wherein the clamping portions of the at least two elastic clamping units are disposed at an upper end of the corresponding elastic clamping unit.

16. The antenna assembly of claim 13, wherein at least one side surface of the nail head and inner surfaces of the clamping portions of the at least two elastic clamping units are shaped to facilitate assembling the inner mandrel with the bushing.

17. The antenna assembly of claim 13, wherein, when the clamping portions of the at least two elastic clamping units are engaged with the upper surface of the nail head, lower ends of the clamping portions engage the upper surface of the nail head and clamp the nail head into the nail head bushing.

* * * * *